Patented Mar. 18, 1952

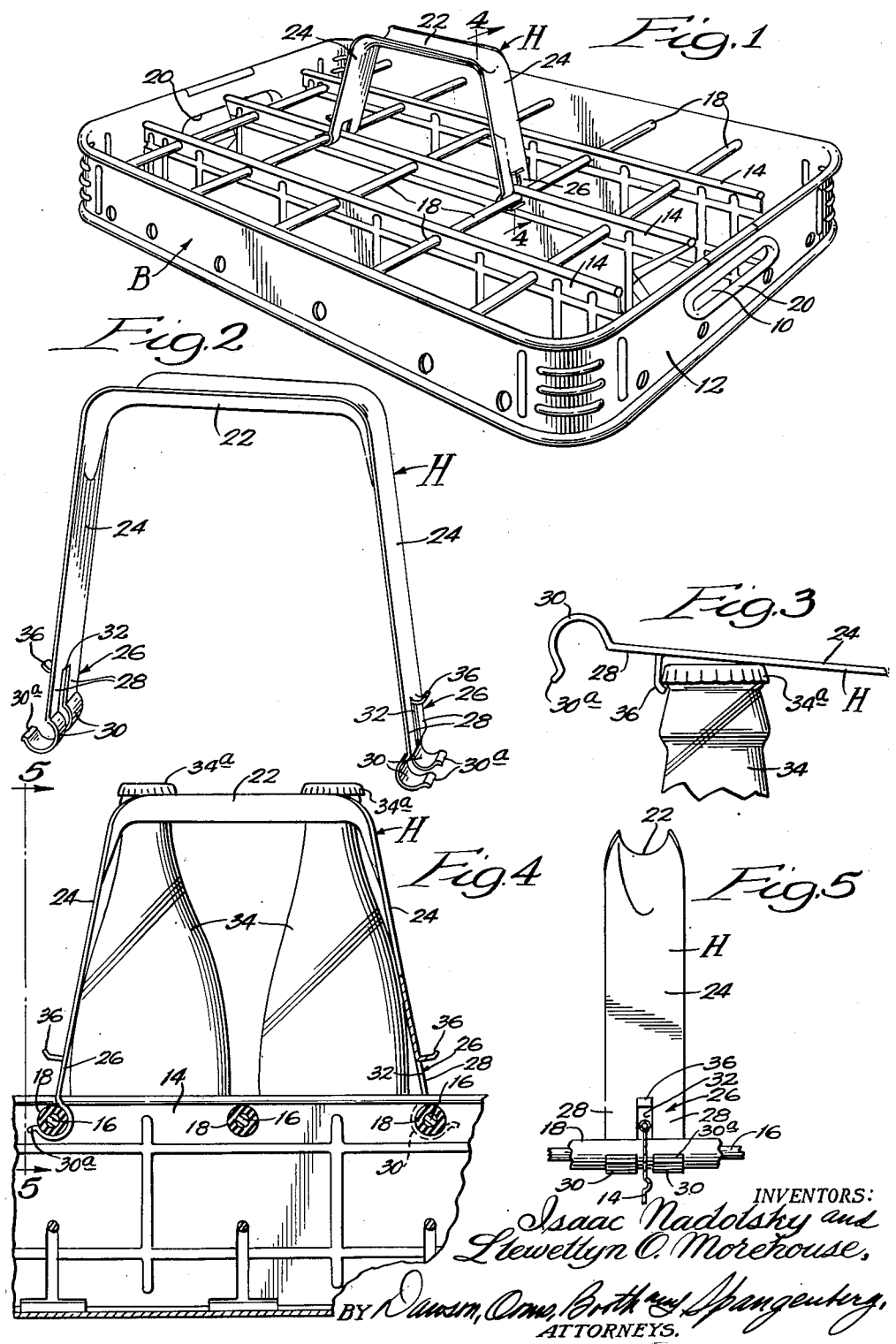

2,589,423

UNITED STATES PATENT OFFICE 2,589,423

BOTTLE CARRIER AND HANDLE FOR USE THEREWITH

Isaac Nadolsky, Grand Rapids, and Llewellyn D. Morehouse, Marion, Mich., assignors, by mesne assignments, to Metal Carrier Corporation, Grand Rapids, Mich., a corporation of Michigan Application August 10, 1949, Serial No. 109,588

2 Claims. (Cl. 224—45)

Our invention relates to an improved bottle carrier having a detachable handle and a handle for use therewith.

The bottle carrier described and claimed in Ralph S. Stevenson application S. N. 53,773, filed October 11, 1948, entitled Bottle Carrier, is light weight, attractive, and inexpensive and is suitable for use in direct bulk selling of bottled beverages to consumers. However, consumers do not usually use the "one bottle" carry whereby commercial bottle handlers can carry the loaded carrier with one hand and for this reason the carrier is somewhat difficult for a consumer to carry with one hand. The present invention provides an improved bottle carrier and a detachable handle for use therewith which overcomes this problem and provides a unit easily handled by consumers. Moreover, the structure provided herein forms a handy bottle opener and does not interfere with stacking the carriers.

It is therefore a general object of the present invention to provide an improved bottle carrier with a handle and a handle for use therewith.

A further object of the present invention is to provide an improved detachable handle for use in a bottle carrier of the type having a longitudinal bottle spacer and transverse struts.

Another object of the present invention is to provide an improved detachable handle for a bottle carrier of the type having a longitudinal bottle spacer and transverse struts, the handle defining a handy bottle opener.

Yet another object of the present invention is to provide an improved bottle carrier with a handle and a detachable handle for use therewith wherein the handle does not interfere with stacking a plurality of bottle carriers with handles.

The novel features which we believe to be characteristic of our invention are set forth with particularity in the appended claims. The invention itself, however, both as to its organization and method of operation may best be understood by reference to the following description taken in connection with the accompanying drawings in which:

Fig. 1 is a view in perspective of a bottle carrier and handle of the present invention;

Fig. 2 is an enlarged view in perspective of the handle of Fig. 1;

Fig. 3 is a fragmentary enlarged view showing use of the bottle opener formed integrally with the handle of Fig. 2;

Fig. 4 is an enlarged cross-sectional view through the axis 4—4, Fig. 1; and,

Fig. 5 is a cross-sectional view through the axis 5—5, Fig. 1.

Referring now to Fig. 1, there is shown a bottle carrier B and a handle H. The carrier B includes a bottom 10 surrounded by the edge wall 12 to define a basket. A plurality of parallel longitudinal spacers or separators 14 are rockably anchored to the bottom 10 to define a plurality of bottle receiving rows. A plurality of transverse struts 16 (Fig. 4) each receive a resilient sleeve 18 of rubber or the like to define a plurality of bottle pockets and yieldably hold the spacers 14 in upright position.

The bottle carrier B, is described and claimed in the pending application of R. S. Stevenson, S. N. 53,773, filed October 11, 1948, entitled Bottle Carrier. This bottle carrier is preferably made of aluminum and is characterized by good ability to resist the blows incident to use without damaging the bottles, attractive and sanitary appearance, long life and low cost. The carrier is provided with a pair of hand openings 20 which are used by bottlers and delivery men in handling the carriers. These hand openings are of limited value to the consumer who desires to carry a single bottle carrier with one hand and does not have the experience to use the "one bottle" carry used by bottle delivery men and other commercial bottle handlers.

The handle H provides a convenient handle that ordinary consumers are capable of using. It is stamped of a single piece of sheet metal which forms the U-shaped member shown. Specifically, the handle H is defined by an upper rounded gripper portion 22 having a pair of depending legs 24. Each leg 24 terminates in a slotted portion 26 where the leg is slotted to define a pair of fingers 28. Each of these fingers defines a hook 30 adapted to underlie and be received on the transverse struts 18.

As shown best in Fig. 5, the slot 32 is of size to fit over the central spacer or separator 14. It anchors the handle H in position transversely of the carrier and, in addition, restrains it in the upright position so that there is no tendency of the handle to tilt out of its anchored position.

The hooks 30 formed on the end of each finger 28 are of size to be received snugly on resilient sleeves 18. As shown, each hook extends substantially 180° about the sleeve on which it fits. Moreover each hook underlays a sleeve to provide a positive lifting action. The tip 30a of each hook is turned backwardly to facilitate attachment of the handle without cutting the resilient sleeves 18.

Since the hooks 30 are bent backwardly over the sleeves 18, as shown in Fig. 4, they define supports for the handle to hold the same against dropping from the sleeves. Even if the handle is accidentally released, however, the slots 32 limit the downward movement of the handle.

The handle H is constructed of material, such as mild steel, that is relatively flexible so that the handle is capable of limited flexure. The legs 24 may then be pulled together to retract the hooks 30 relative to each other and position the hooks in registry with the sleeves 18. The legs may then be released to cause the hooks to snap into position about the sleeves 18. This ease of detachment is important since a bottle carrier B may be used in many operations where the handle H is unnecessary and even undesirable.

In accordance with the present invention the legs 24 of the handle H are made of limited height so that the gripping portion 22 is positioned below the caps of the bottles in the carrier. This is shown clearly in Fig. 4 where the bottles 34 extend above the gripper portion 24 of the handle H. By providing the handle where the gripper portion is below the caps of the bottles, interference of the handle with stacking of a plurality of bottle carriers is avoided and the handles may be left on the carriers even though they are stacked.

In accordance with a further feature of the present invention, the handle H defines a handy bottle opener. This is accomplished by bending back a portion of the metal strip defined by slot 32 to form the bottle opening hook 36. As shown in Fig. 3, this bottle opening hook may be used by detaching the handle H from the carrier B and positioning the hook 36 over the cap 34a of the bottle desired to be opened.

While we have shown and described a specific embodiment of our invention, it will of course be understood that many modifications and alternative constructions may be made without departing from the true spirit and scope thereof. We therefore intend by the appended claims to cover all variations and alternative constructions that fall within the true spirit and scope of our invention.

What we claim as new and desire to secure by Letters Patent of the United States is:

1. In combination with a bottle carrier of the type having a bottle basket with a longitudinal spacer and transverse struts, a detachable handle comprising a substantially U-shaped member with a central gripping portion and depending leg portions capable of retracting movement, each of said leg portions being slotted at its end to provide a pair of fingers, said fingers terminating in outwardly extending hook portions bent inwardly at their tops at a spaced distance from the upper end of said slots so as to both overlie and underlie said struts and thereby hold said handle in a fixed vertical position above said carrier, whereby said handle can be easily attached to or removed from said basket by merely first retracting one of said leg portions by pressing downwardly and inwardly thereon to seat the top of the slot of said retracted leg on the top of said spacer inside of one of said struts while the hook portion of the other leg is secured about another of said struts, and then raising said retracted leg.

2. In combination with a bottle carrier of the type having a bottle basket with a longitudinal spacer and transverse rods, a detachable handle comprising a substantially U-shaped member with a central gripping portion and depending leg portions capable of being flexed inwardly to temporarily retract said leg portions with respect to each other, each of said leg portions terminating in a hook portion engaging said rods, said hook portions facing outwardly and having their upper portions extending inwardly with respect to said leg portions so as to both overlie and underlie said struts, said leg portions being longitudinally slotted from the lower end thereof to a substantial distance above said hook portion so that said hook portion and part of said leg portion thereabove is separated to provide a pair of fingers fitting snugly on opposite sides of said spacer.

ISAAC NADOLSKY.
LLEWELLYN D. MOREHOUSE.

REFERENCES CITED

The following references are of record in the file of this patent:

UNITED STATES PATENTS

| Number | Name | Date |
|---|---|---|
| 1,349,457 | Hurd | Aug. 10, 1920 |
| 1,472,997 | Stevenson | Nov. 6, 1923 |
| 1,559,695 | Hatch | Nov. 3, 1925 |
| 1,906,647 | Smith et al. | May 2, 1933 |
| 2,049,884 | Wurster et al. | Aug. 4, 1936 |
| 2,271,901 | Smith et al. | Feb. 3, 1942 |
| 2,396,003 | Goldman | Mar. 5, 1946 |
| 2,424,094 | Herr | July 15, 1947 |
| 2,531,092 | Waller | Nov. 21, 1950 |

FOREIGN PATENTS

| Number | Country | Date |
|---|---|---|
| 191,923 | Great Britain | Jan. 25, 1923 |